US011130835B2

(12) United States Patent
Evans et al.

(10) Patent No.: US 11,130,835 B2
(45) Date of Patent: Sep. 28, 2021

(54) LIQUID EPOXY RESIN COMPOSITION USEFUL FOR MAKING POLYMERS

(71) Applicant: SWIMC LLC, Cleveland, OH (US)

(72) Inventors: Richard H. Evans, Wexford, PA (US); Benjamin J. Webster, Pittsburgh, PA (US); Robert M. O'Brien, Monongahela, PA (US); Jeffrey Niederst, Leechburg, PA (US)

( * ) Notice: Subject to any disclaimer, the term of this patent is extended or adjusted under 35 U.S.C. 154(b) by 243 days.

(21) Appl. No.: 15/773,093

(22) PCT Filed: Nov. 3, 2016

(86) PCT No.: PCT/US2016/060332
§ 371 (c)(1),
(2) Date: May 2, 2018

(87) PCT Pub. No.: WO2017/079437
PCT Pub. Date: May 11, 2017

(65) Prior Publication Data
US 2019/0031816 A1 Jan. 31, 2019

Related U.S. Application Data

(60) Provisional application No. 62/250,217, filed on Nov. 3, 2015.

(51) Int. Cl.
| | | |
|---|---|---|
| C08L 71/00 | (2006.01) | |
| C08L 63/00 | (2006.01) | |
| C08G 59/06 | (2006.01) | |
| C08G 59/62 | (2006.01) | |
| C08G 59/24 | (2006.01) | |
| C09D 163/00 | (2006.01) | |
| C08G 59/02 | (2006.01) | |
| C08L 71/03 | (2006.01) | |
| C09D 171/03 | (2006.01) | |

(52) U.S. Cl.
CPC ......... *C08G 59/063* (2013.01); *C08G 59/022* (2013.01); *C08G 59/066* (2013.01); *C08G 59/245* (2013.01); *C08G 59/62* (2013.01); *C08L 71/03* (2013.01); *C09D 163/00* (2013.01); *C09D 171/03* (2013.01)

(58) Field of Classification Search
None
See application file for complete search history.

(56) References Cited

U.S. PATENT DOCUMENTS

| | | | |
|---|---|---|---|
| 2,500,449 A | 3/1950 | Bradley | |
| 2,528,933 A | 11/1950 | Wiles | |
| 2,633,458 A | 3/1953 | Shokal | |
| 2,681,901 A | 6/1954 | Wiles et al. | |
| 2,694,694 A | 11/1954 | Owen et al. | |
| 2,767,157 A | 10/1956 | Masters et al. | |
| 2,824,855 A | 2/1958 | Freeman et al. | |
| 2,951,778 A * | 9/1960 | Haberlin | C08G 59/182 428/416 |
| 3,006,891 A | 10/1961 | Leroy et al. | |
| 3,041,300 A | 6/1962 | Morrison | |
| 3,085,992 A | 4/1963 | Lee et al. | |
| 3,102,043 A | 8/1963 | Arthur et al. | |
| 3,121,727 A | 2/1964 | Baliker, Jr. et al. | |
| 3,153,008 A | 10/1964 | Fox | |
| 3,220,974 A | 11/1965 | Fox | |
| 3,275,601 A | 9/1966 | Schnell et al. | |
| 3,288,884 A | 11/1966 | Sonnabend et al. | |
| 3,297,724 A | 1/1967 | McConnell et al. | |
| 3,313,775 A | 4/1967 | Frankel | |
| 3,321,424 A | 5/1967 | Imes et al. | |
| 3,366,600 A | 1/1968 | Haberlin et al. | |
| 3,379,684 A | 4/1968 | Wiesner et al. | |
| 3,404,102 A | 10/1968 | Starcher et al. | |
| 3,475,266 A | 10/1969 | Albert | |
| 3,477,990 A | 11/1969 | Mark et al. | |
| 3,480,695 A | 11/1969 | Warren | |
| 3,491,111 A | 1/1970 | Lin | |
| 3,491,112 A | 1/1970 | Lin | |
| 3,491,116 A | 1/1970 | Lin | |
| 3,509,174 A | 4/1970 | Lin | |
| 3,553,119 A | 1/1971 | Wright et al. | |
| 3,578,615 A | 5/1971 | Moore et al. | |
| 3,624,107 A | 11/1971 | Lin | |
| 3,627,787 A | 12/1971 | Lin | |
| 3,641,011 A | 2/1972 | Lin et al. | |
| 3,642,828 A | 2/1972 | Farber et al. | |
| 3,681,390 A | 8/1972 | Lin | |
| 3,775,424 A | 11/1973 | Farber | |
| 3,853,869 A | 12/1974 | Farber | |
| 3,876,606 A | 4/1975 | Kehr | |
| 3,879,348 A | 4/1975 | Serini et al. | |
| 3,888,812 A | 6/1975 | Plettner | |
| 3,905,926 A | 9/1975 | D'Alelio | |
| 3,920,510 A | 11/1975 | Hatano et al. | |

(Continued)

FOREIGN PATENT DOCUMENTS

| | | |
|---|---|---|
| CA | 2280409 A1 | 2/2001 |
| CA | 2570312 A1 | 1/2006 |

(Continued)

OTHER PUBLICATIONS

CertiChem Inc., "Test Method Nomination: MCF-7 Cell Proliferation Assay of Estrogenic Activity," National Toxicology Program Interagency Center for the Evaluation of Alternative Toxicological Methods (NICEATM), Jan. 2006, 102 pages, Retrieved from the Internet [URL: https://ntp.niehs.nih.gov/iccvam/methods/endocrine/endodocs/submdoc.pdf].

(Continued)

*Primary Examiner* — Michael J Feely
(74) *Attorney, Agent, or Firm* — Patterson Thuente Pedersen, P.A.

(57) ABSTRACT

A liquid epoxy resin composition is provided. In preferred embodiments, the liquid epoxy resin composition is free of bisphenol A, bisphenol F, and bisphenol S, including epoxides thereof, and is useful in preparing a polyether polymer having utility in coating compositions, including, e.g., coating compositions for use on food or beverage containers.

34 Claims, No Drawings

(56) References Cited

U.S. PATENT DOCUMENTS

| | | |
|---|---|---|
| 3,943,187 A | 3/1976 | Wu et al. |
| 3,950,451 A | 4/1976 | Hirosi et al. |
| 3,959,571 A | 5/1976 | Yahagi et al. |
| RE28,862 E | 6/1976 | Siemonsen et al. |
| 3,971,808 A | 7/1976 | Baumann et al. |
| 3,984,363 A | 10/1976 | D'Alelio |
| 4,009,224 A | 2/1977 | Warnken |
| 4,011,184 A | 3/1977 | Van et al. |
| 4,051,195 A | 9/1977 | McWhorter |
| 4,076,676 A | 2/1978 | Sommerfeld et al. |
| 4,076,764 A | 2/1978 | Bauer |
| 4,111,910 A | 9/1978 | Baggett |
| 4,122,060 A | 10/1978 | Yallourakis |
| 4,172,103 A | 10/1979 | Cohen et al. |
| 4,173,594 A | 11/1979 | Dyszlewski |
| 4,212,781 A | 7/1980 | Evans et al. |
| 4,247,439 A | 1/1981 | Matthews et al. |
| 4,283,428 A | 8/1981 | Birkmeyer |
| 4,285,847 A | 8/1981 | Ting et al. |
| 4,333,809 A | 6/1982 | Schreckenberg et al. |
| 4,340,716 A | 7/1982 | Hata et al. |
| 4,368,315 A | 1/1983 | Sikdar |
| 4,374,233 A | 2/1983 | Loucks et al. |
| 4,399,241 A | 8/1983 | Ting et al. |
| 4,413,015 A | 11/1983 | Anderson et al. |
| 4,446,258 A | 5/1984 | Chu et al. |
| 4,468,483 A | 8/1984 | Yeakey et al. |
| 4,476,262 A | 10/1984 | Chu et al. |
| 4,487,861 A | 12/1984 | Winner |
| 4,510,513 A | 4/1985 | Yamaguchi et al. |
| 4,517,322 A | 5/1985 | Birkmeyer et al. |
| 4,522,984 A | 6/1985 | Watanabe et al. |
| 4,552,814 A | 11/1985 | Cavitt et al. |
| 4,564,655 A | 1/1986 | Liu |
| 4,600,737 A | 7/1986 | Georgalas et al. |
| 4,622,368 A | 11/1986 | Verbicky, Jr. et al. |
| 4,647,612 A | 3/1987 | Ranka et al. |
| 4,665,149 A | 5/1987 | Bertram et al. |
| 4,707,534 A | 11/1987 | Schultz |
| 4,729,983 A | 3/1988 | Satake et al. |
| 4,757,132 A | 7/1988 | Brunelle et al. |
| 4,794,102 A | 12/1988 | Petersen et al. |
| 4,794,156 A | 12/1988 | Ho et al. |
| 4,806,597 A | 2/1989 | Gallucci et al. |
| 4,849,502 A | 7/1989 | Evans et al. |
| 4,880,892 A | 11/1989 | Urano et al. |
| 4,963,602 A | 10/1990 | Patel |
| 4,994,217 A | 2/1991 | Banevicius et al. |
| 5,010,147 A | 4/1991 | Westeppe et al. |
| 5,068,284 A | 11/1991 | Ullman et al. |
| 5,080,961 A | 1/1992 | Macy et al. |
| 5,102,608 A | 4/1992 | Frencken et al. |
| 5,115,082 A | 5/1992 | Mercer et al. |
| 5,162,406 A | 11/1992 | Meyer et al. |
| 5,201,436 A | 4/1993 | Owens et al. |
| 5,212,241 A | 5/1993 | Woo et al. |
| 5,264,503 A | 11/1993 | Marx et al. |
| 5,288,839 A | 2/1994 | Greco |
| 5,296,525 A | 3/1994 | Spencer et al. |
| 5,446,009 A | 8/1995 | Minami et al. |
| 5,494,950 A | 2/1996 | Asakage et al. |
| 5,496,921 A | 3/1996 | Sakashita et al. |
| 5,527,840 A | 6/1996 | Chutko et al. |
| 5,567,781 A | 10/1996 | Martino et al. |
| 5,571,907 A | 11/1996 | Sachinala et al. |
| 5,576,413 A | 11/1996 | Bussink et al. |
| 5,591,788 A | 1/1997 | Anderson et al. |
| 5,623,031 A | 4/1997 | Imura et al. |
| 5,677,398 A | 10/1997 | Motoshima et al. |
| 5,686,185 A | 11/1997 | Correll et al. |
| 5,718,352 A | 2/1998 | Diekhoff et al. |
| 5,718,353 A | 2/1998 | Kanfer et al. |
| 5,803,301 A | 9/1998 | Sato et al. |
| 5,807,912 A | 9/1998 | Wu et al. |
| 5,811,498 A | 9/1998 | Perumal et al. |
| 5,830,952 A | 11/1998 | Pedersen et al. |
| 5,859,172 A | 1/1999 | Sakashita et al. |
| 5,872,196 A | 2/1999 | Murata et al. |
| 5,880,248 A | 3/1999 | Sakashita et al. |
| 5,916,933 A | 6/1999 | Johnson et al. |
| 5,922,817 A | 7/1999 | Pedersen et al. |
| 5,925,694 A | 7/1999 | Stengel-Rutkowski et al. |
| 5,994,462 A | 11/1999 | Srinivasan et al. |
| 6,008,273 A | 12/1999 | Leibelt et al. |
| 6,034,157 A | 3/2000 | Craun et al. |
| 6,043,333 A | 3/2000 | Kuboki et al. |
| 6,048,931 A | 4/2000 | Fujita et al. |
| 6,060,577 A | 5/2000 | Davis |
| 6,133,402 A | 10/2000 | Coates et al. |
| 6,201,070 B1 | 3/2001 | Kumabe et al. |
| 6,225,436 B1 | 5/2001 | Eiffler et al. |
| 6,242,533 B1 | 6/2001 | Kurimoto et al. |
| 6,306,934 B1 | 10/2001 | Bode et al. |
| 6,376,021 B1 | 4/2002 | Spellane |
| 6,382,454 B1 | 5/2002 | Buffard et al. |
| 6,399,738 B1 | 6/2002 | Ito |
| 6,469,127 B1 | 10/2002 | Furunaga et al. |
| 6,472,472 B2 | 10/2002 | Jung et al. |
| 6,566,426 B1 | 5/2003 | Kanaida et al. |
| 6,576,718 B1 | 6/2003 | Yeager et al. |
| 6,579,829 B2 | 6/2003 | Nishimura et al. |
| 6,608,163 B2 | 8/2003 | Bailly et al. |
| 6,660,688 B2 | 12/2003 | Yamada et al. |
| 6,706,350 B2 | 3/2004 | Sato et al. |
| 6,777,464 B1 | 8/2004 | Watanabe et al. |
| 6,784,228 B2 | 8/2004 | Ogura et al. |
| 6,794,445 B2 | 9/2004 | Reusmann et al. |
| 6,808,752 B2 | 10/2004 | Mallen |
| 6,833,398 B2 | 12/2004 | Agarwal et al. |
| 6,844,071 B1 | 1/2005 | Wang et al. |
| 6,894,093 B2 | 5/2005 | Bittner |
| 6,916,874 B2 | 7/2005 | Mazza et al. |
| 6,924,328 B2 | 8/2005 | Legleiter et al. |
| 6,984,262 B2 | 1/2006 | King et al. |
| 6,984,608 B2 | 1/2006 | Makitalo et al. |
| 7,022,765 B2 | 4/2006 | Adedeji et al. |
| 7,037,584 B2 | 5/2006 | Wind et al. |
| 7,063,914 B2 | 6/2006 | Kawano et al. |
| 7,078,077 B2 | 7/2006 | Lynch et al. |
| 7,150,902 B2 | 12/2006 | Farha |
| 7,157,119 B2 | 1/2007 | Tang et al. |
| 7,189,787 B2 | 3/2007 | O'Brien et al. |
| 7,198,849 B2 | 4/2007 | Stapperfenne et al. |
| 7,208,538 B2 | 4/2007 | Taylor et al. |
| 7,256,228 B2 | 8/2007 | Agarwal et al. |
| 7,262,261 B2 | 8/2007 | Brindopke et al. |
| 7,332,557 B2 | 2/2008 | Shinohara et al. |
| 7,332,560 B2 | 2/2008 | Heuer et al. |
| 7,397,139 B2 | 7/2008 | Ikezawa et al. |
| 7,446,234 B2 | 11/2008 | More et al. |
| 7,544,727 B2 | 6/2009 | Ikezawa et al. |
| 7,585,904 B2 | 9/2009 | Nakamura |
| 7,592,047 B2 | 9/2009 | O'Brien et al. |
| 7,619,056 B2 | 11/2009 | East et al. |
| 7,635,662 B2 | 12/2009 | Kabashima et al. |
| 7,666,953 B2 | 2/2010 | Nakamura et al. |
| 7,675,185 B2 | 3/2010 | Tendou et al. |
| 7,682,674 B2 | 3/2010 | Vogt et al. |
| 7,709,582 B2 | 5/2010 | Kouchi et al. |
| 7,803,439 B2 | 9/2010 | Crawford et al. |
| 7,803,440 B2 | 9/2010 | Crawford et al. |
| 7,820,772 B2 | 10/2010 | Usui et al. |
| 7,838,577 B2 | 11/2010 | Hayakawa et al. |
| 7,846,998 B2 | 12/2010 | Akagi et al. |
| 7,910,170 B2 | 3/2011 | Evans et al. |
| 7,915,743 B2 | 3/2011 | Ishizawa et al. |
| 7,981,511 B2 | 7/2011 | Maenaka et al. |
| 7,981,515 B2 | 7/2011 | Ambrose et al. |
| 7,985,522 B2 | 7/2011 | Tajima et al. |
| 8,013,052 B2 | 9/2011 | Nakamura et al. |
| 8,110,614 B2 | 2/2012 | Ito et al. |
| 8,129,495 B2 | 3/2012 | Evans et al. |
| 8,142,858 B2 | 3/2012 | Mayr et al. |
| 8,168,276 B2 | 5/2012 | Cleaver et al. |

(56) References Cited

U.S. PATENT DOCUMENTS

| | | | |
|---|---|---|---|
| 8,168,721 B2 | 5/2012 | Marsh et al. | |
| 8,178,598 B2 | 5/2012 | Hakuya | |
| 8,449,960 B2 | 5/2013 | Skillman et al. | |
| 8,465,846 B2 | 6/2013 | O'Brien et al. | |
| 8,492,467 B2 | 7/2013 | Yamaguchi | |
| 8,519,085 B2 | 8/2013 | Evans et al. | |
| 8,927,075 B2 | 1/2015 | Gibanel et al. | |
| 9,409,219 B2 | 8/2016 | Niederst et al. | |
| 9,475,328 B2 | 10/2016 | Niederst et al. | |
| 9,540,484 B2 | 1/2017 | Craun et al. | |
| 9,605,177 B2 | 3/2017 | Tang et al. | |
| 9,724,276 B2 | 8/2017 | Niederst et al. | |
| 9,944,749 B2 | 4/2018 | Niederst et al. | |
| 1,011,302 A1 | 10/2018 | Niederst et al. | |
| 2003/0170396 A1 | 9/2003 | Yokoi et al. | |
| 2003/0171527 A1 | 9/2003 | Burgoyne et al. | |
| 2003/0181628 A1 | 9/2003 | Horn et al. | |
| 2003/0203991 A1 | 10/2003 | Schottman et al. | |
| 2003/0209553 A1 | 11/2003 | Horn et al. | |
| 2003/0232145 A1 | 12/2003 | Inomata et al. | |
| 2004/0044101 A1 | 3/2004 | Hirose et al. | |
| 2004/0092674 A1 | 5/2004 | Brindopke et al. | |
| 2004/0110908 A1 | 6/2004 | Idemura et al. | |
| 2004/0171746 A1 | 9/2004 | Parekh et al. | |
| 2004/0176563 A1 | 9/2004 | Shinohara et al. | |
| 2004/0214916 A1 | 10/2004 | Patel et al. | |
| 2004/0214926 A1 | 10/2004 | Bittner | |
| 2004/0220372 A1 | 11/2004 | Qi et al. | |
| 2005/0014004 A1 | 1/2005 | King et al. | |
| 2005/0075465 A1 | 4/2005 | Bolle et al. | |
| 2005/0090044 A1 | 4/2005 | Kayaba et al. | |
| 2005/0090593 A1 | 4/2005 | Heuer et al. | |
| 2005/0131195 A1* | 6/2005 | Asakage | C08G 59/00 528/95 |
| 2005/0196629 A1 | 9/2005 | Bariatinsky et al. | |
| 2005/0215670 A1 | 9/2005 | Shimasaki et al. | |
| 2006/0025559 A1 | 2/2006 | Wehrmann et al. | |
| 2006/0052523 A1 | 3/2006 | Bushendorf et al. | |
| 2006/0134541 A1 | 6/2006 | Fujii et al. | |
| 2006/0142442 A1 | 6/2006 | Scherzer et al. | |
| 2007/0036903 A1 | 2/2007 | Mayr et al. | |
| 2007/0065589 A1 | 3/2007 | Florian | |
| 2007/0065608 A1 | 3/2007 | Niederst | |
| 2007/0087146 A1 | 4/2007 | Evans et al. | |
| 2007/0099130 A1 | 5/2007 | Takahashi et al. | |
| 2007/0154643 A1 | 7/2007 | Schmid et al. | |
| 2007/0281179 A1 | 12/2007 | Ambrose et al. | |
| 2008/0009599 A1 | 1/2008 | East et al. | |
| 2008/0033080 A1 | 2/2008 | Mader et al. | |
| 2008/0171195 A1 | 7/2008 | Gothlich et al. | |
| 2008/0193689 A1 | 8/2008 | Masselin et al. | |
| 2008/0246173 A1 | 10/2008 | Braidwood et al. | |
| 2008/0251757 A1 | 10/2008 | Yamamoto et al. | |
| 2008/0319102 A1 | 12/2008 | Eckert et al. | |
| 2008/0319156 A1 | 12/2008 | Fischer et al. | |
| 2009/0036631 A1* | 2/2009 | Kaji | C08G 65/38 528/95 |
| 2009/0068473 A1 | 3/2009 | Van Wessel et al. | |
| 2009/0088535 A1 | 4/2009 | Arita et al. | |
| 2009/0092827 A1 | 4/2009 | Robinson | |
| 2009/0158963 A1 | 6/2009 | O'Dell et al. | |
| 2009/0247032 A1 | 10/2009 | Mori et al. | |
| 2009/0280423 A1 | 11/2009 | Yahiro et al. | |
| 2009/0281224 A1 | 11/2009 | Koh et al. | |
| 2009/0326107 A1 | 12/2009 | Bittner | |
| 2010/0056663 A1 | 3/2010 | Ito et al. | |
| 2010/0056721 A1 | 3/2010 | Wright et al. | |
| 2010/0056726 A1 | 3/2010 | Payot et al. | |
| 2010/0080433 A1 | 3/2010 | Gibanel et al. | |
| 2010/0086716 A1 | 4/2010 | Ruediger et al. | |
| 2010/0143681 A1 | 6/2010 | Yano et al. | |
| 2010/0285309 A1 | 11/2010 | Barriau et al. | |
| 2011/0042338 A1 | 2/2011 | Pecorini et al. | |
| 2011/0160408 A1 | 6/2011 | De Brouwer et al. | |
| 2011/0294921 A1 | 12/2011 | Smith | |
| 2011/0315591 A1 | 12/2011 | Lespinasse et al. | |
| 2012/0125800 A1 | 5/2012 | Doreau et al. | |
| 2012/0149340 A1 | 6/2012 | Selph et al. | |
| 2012/0165429 A1 | 6/2012 | Boutevin et al. | |
| 2012/0172568 A1 | 7/2012 | Ueda | |
| 2012/0282475 A1 | 11/2012 | Fuhry et al. | |
| 2012/0301645 A1 | 11/2012 | Moussa et al. | |
| 2012/0301646 A1 | 11/2012 | List et al. | |
| 2012/0301647 A1 | 11/2012 | Moussa et al. | |
| 2012/0302690 A1 | 11/2012 | Cunningham et al. | |
| 2013/0052381 A1 | 2/2013 | Gallucci et al. | |
| 2013/0196037 A1 | 8/2013 | O'Brien et al. | |
| 2013/0206756 A1 | 8/2013 | Niederst et al. | |
| 2013/0280455 A1 | 10/2013 | Evans et al. | |
| 2013/0316109 A1 | 11/2013 | Niederst et al. | |
| 2013/0324652 A1 | 12/2013 | Pompignano et al. | |
| 2014/0113093 A1 | 4/2014 | Corbin et al. | |
| 2014/0322465 A1 | 10/2014 | Kaleem et al. | |
| 2014/0378565 A1* | 12/2014 | Gelmont | C08K 5/053 521/107 |
| 2015/0021323 A1 | 1/2015 | Niederst et al. | |
| 2015/0151878 A1 | 6/2015 | Niederst et al. | |
| 2015/0197657 A1 | 7/2015 | Niederst et al. | |
| 2015/0203713 A1 | 7/2015 | Niederst et al. | |
| 2016/0107818 A1 | 4/2016 | Kaleem et al. | |
| 2016/0122581 A1 | 5/2016 | You et al. | |
| 2016/0272576 A1 | 9/2016 | Gibanel et al. | |
| 2017/0029657 A1 | 2/2017 | Niederst et al. | |
| 2017/0051177 A1 | 2/2017 | Prouvost et al. | |
| 2017/0088745 A1 | 3/2017 | Matthieu et al. | |
| 2017/0096521 A1 | 4/2017 | Niederst et al. | |
| 2018/0112101 A1 | 4/2018 | Evans et al. | |
| 2018/0112102 A1 | 4/2018 | Evans et al. | |

FOREIGN PATENT DOCUMENTS

| | | |
|---|---|---|
| CA | 2280409 C | 5/2008 |
| CN | 101096411 A | 1/2008 |
| CN | 101244290 A | 8/2008 |
| CN | 101484548 A | 7/2009 |
| CN | 104479105 A | 4/2015 |
| EP | 0265791 A2 | 5/1988 |
| EP | 0475359 A2 | 3/1992 |
| EP | 0620238 A2 | 10/1994 |
| EP | 0185118 B1 | 9/1995 |
| EP | 1333075 A1 | 8/2003 |
| EP | 1818350 A1 | 8/2007 |
| JP | S63304068 A | 12/1988 |
| JP | H0255727 A | 2/1990 |
| JP | H07126574 A | 5/1995 |
| JP | H07138502 A | 5/1995 |
| JP | H07196770 A | 8/1995 |
| JP | H08151428 A | 6/1996 |
| JP | H08230328 A | 9/1996 |
| JP | 2000005019 A | 1/2000 |
| JP | 2000-007757 A | 7/2001 |
| JP | 2000-007891 A | 7/2001 |
| JP | 2002097250 A | 4/2002 |
| JP | 2002097409 A | 4/2002 |
| JP | 2002138245 A | 5/2002 |
| JP | 2002155727 A | 5/2002 |
| JP | 2002220563 A | 8/2002 |
| JP | 2003012763 A | 1/2003 |
| JP | 2003176348 A | 6/2003 |
| JP | 2003178348 A | 6/2003 |
| JP | 2003183352 A | 7/2003 |
| JP | 3484546 B2 | 1/2004 |
| JP | 2004010874 A | 1/2004 |
| JP | 2004053016 A | 2/2004 |
| JP | 2005320446 A | 11/2005 |
| JP | 2006176658 A | 7/2006 |
| JP | 2011-207932 A | 4/2013 |
| KR | 100804293 B1 | 2/2008 |
| WO | WO-9526997 A1 | 10/1995 |
| WO | WO-9728905 A1 | 8/1997 |
| WO | WO-0071337 A1 | 11/2000 |
| WO | WO-2004050740 A1 | 6/2004 |
| WO | WO-2007048094 A2 | 4/2007 |
| WO | WO-2007054304 A1 | 5/2007 |

(56) References Cited

FOREIGN PATENT DOCUMENTS

| WO | WO-2008137562 A1 | 11/2008 |
|---|---|---|
| WO | WO-2009015493 A1 | 2/2009 |
| WO | WO-2009036790 A1 | 3/2009 |
| WO | WO-2009089145 A1 | 7/2009 |
| WO | WO-2010118349 A1 | 10/2010 |
| WO | WO-2010118356 A1 | 10/2010 |
| WO | WO-2010134608 A1 | 11/2010 |
| WO | WO-2011130671 A2 | 10/2011 |
| WO | WO-2012091701 A1 | 7/2012 |
| WO | WO-2012109278 A2 | 8/2012 |
| WO | WO-2012149340 A1 | 11/2012 |
| WO | WO-2012151184 A1 | 11/2012 |
| WO | WO-2012161758 A2 | 11/2012 |
| WO | WO-2012162298 A1 | 11/2012 |
| WO | WO-2012162299 A1 | 11/2012 |
| WO | WO 2013028607 A1 | 2/2013 |
| WO | WO-2013119686 A1 | 8/2013 |
| WO | WO-2013149234 A2 | 10/2013 |
| WO | WO-2013169459 A1 | 11/2013 |
| WO | WO-2014025997 A1 | 2/2014 |
| WO | WO-2014140233 A1 | 9/2014 |
| WO | WO-2014140234 A1 | 9/2014 |
| WO | WO-2016201407 A1 | 12/2016 |

OTHER PUBLICATIONS

Declaration of Dr. Larry B. Brandenburger under 37 C.P.R. §1.132 for Control No. 95/001,950 Concerning Inter Partes Reexamination of U.S. Pat. No. 8,092,876, 12 pages.
Dow Chemical Company., "D.E.R.™ 661, Solid Epoxy Resin," Product Information Form No. 296-01462-1007X-TD, 3 pages.
DYTEK® A-Amine, Downloaded from the Oct. 16, 2014, Internet Archives capture at [https://web.archive.org/web/20141016043145/http://dytek.invista.com/Products/Amines/dytek-a-amine].
Eastman, "Eastman Tritan™ Copolyester—Lack of Estrogen and Testosterone Activity," TRS-270, Apr. 2010, 3 pages.
European Search Report for Application No. 12744671.4, dated Dec. 17, 2015, 5 pages.
European Search Report for Application No. 12790169.2, dated Nov. 26, 2015, 5 pages.
European Search Report for Application No. 17182623.3, dated Oct. 11, 2017, 8 pages.
Extended European Search Report for Application No. 15779232.6, dated Feb. 23, 2018, 13 pages.
Extended European Search Report for Application No. EP13827304, dated Mar. 21, 2016, 11 pages.
Fang H., et al., "Quantitative Comparisons of in Vitro Assays for Estrogenic Activities," Environmental Health Perspectives, Aug. 2000, vol. 108 (8), pp. 723-729.
Fang H., et al., "Structure-Activity Relationships for a Large Diverse Set of Natural, Synthetic, and Environmental Estrogens," Chemical Research in Toxicology, Mar. 2001, vol. 14 (3), pp. 280-294.
First Office Action dated Oct. 31, 2018 for Chinese Application No. 201610835512.9, 7 pages.
"Flame Retardant Bisphenol F", Product Information Sheets, Nippon Kasei Chemical, 2013, 2 pages.
Flick E.W., "Epoxy Resins, Curing Agents, Compounds, and Modifiers—An Industrial Guide," Second Edition, 1993, 10 pages. available at http://www.daryatamin.com/uploads/Books%20File/Epoxy%20Resins,%20Curing%20Agents,%20Compounds,%20and%20Modifiers%20An%20Industrial%20Guide.pdf.
Grace Darex® Packaging Technologies, A Global Partner for Your Global Business, Product Book, 2006, 4 pages.
Guilin, et al., "Environmentally friendly paint formulation design," Chemical Industry Press, ISBN: 978-7-5025-9943-0, 2007, pp. 207-209 (6 pages).
Hashimoto Y., et al., "Measurement of Estrogenic Activity of Chemicals for the Development of New Dental Polymers," Toxicology in Vitro, 2001, vol. 15 (4-5), pp. 421-425.

International Preliminary Report on Patentability for Application No. PCT/US2011/032738, dated Oct. 26, 2012, 5 pages.
International Preliminary Report on Patentability for Application No. PCT/US2012/024191, dated Aug. 22, 2013, 7 pages.
International Preliminary Report on Patentability for Application No. PCT/US2012/024193, dated Aug. 22, 2013, 7 pages.
International Preliminary Report on Patentability for Application No. PCT/US2013/024960, dated Aug. 21, 2014, 9 pages.
International Preliminary Report on Patentability for Application No. PCT/US2016/060332, dated May 17, 2018, 8 pages.
International Search Report and Written Opinion for Application No. PCT/US2011/032738 dated Jan. 18, 2012, 13 pages.
International Search Report and Written Opinion for Application No. PCT/US2012/024191, dated Dec. 28, 2012, 13 pages.
International Search Report and Written Opinion for Application No. PCT/US2012/024193 dated Oct. 31, 2012, 9 pages.
International Search Report and Written Opinion for Application No. PCT/US2013/024960, dated May 31, 2013, 11 pages.
International Search Report and Written Opinion for Application No. PCT/US2013/054132, dated Oct. 23, 2013, 10 pages.
International Search Report and Written Opinion for Application No. PCT/US2015/025723, dated Jun. 29, 2015, 16 pages.
International Search Report and Written Opinion for Application No. PCT/US2016/060332, dated Feb. 12, 2017, 10 pages.
Jungang G., "Kinetics of Epoxy Resins Formation from Bisphenol-A,Bisphenol-S, and Epichlorohydrin," Journal of Applied Polymer Science, vol. 48, 1993, pp. 237-241.
Kitamura S., et al., "Comparative Study of the Endocrine-Disrupting Activity of Bisphenol A and 19 Related Compounds," Toxicological Sciences, Jan. 5, 2005, vol. 84 (2), pp. 249-259.
Kobayashi S., et al., "Stereo Structure-Controlled and Electronic Structure-Controlled Estrogen-Like Chemicals to Design and Develop Non-estrogenic Bisphenol A Analogs Based on Chemical Hardness Concept," Chemical & Pharmaceutical Bulletin,Dec. 2006, vol. 54 (12), pp. 1633-1638.
Liu Z., et al., "Preparation, Characterization and Thermal Properties of Tetramethylbisphenol F Exposy Resin and Mixed Systems," Polymer International, Apr. 2012, vol. 61 (4), pp. 565-570.
Matasa C.G., et al., "A Wish List for Orthodontic Materials, 2005," The Orthodontic Materials Insider, Dec. 2004, vol. 16 (4), 8 pages.
Matsumoto S., et al., "The Crystal Structure of Two New Developers for High-Performance Thermo-Sensitive Paper: H-Bonded Network in Urea-Urethane Derivatives," Dyes and Pigments, May 2010, vol. 85 (3), pp. 139-142.
Mendum T., et al., "Concentration of Bisphenol A in Thermal Paper," Green Chemistry Letters and Reviews, Research Letter, Mar. 2011, vol. 4 (1), pp. 81-86.
Mesnage, et al., "Transcriptome Profiling Reveals Bisphenol A Alternatives Activate Estrogen Receptor Alpha in Human Breast Cancer Cells," Toxicological Sciences, 2017, vol. 158 (2), pp. 431-443.
Meti, "Current Status of Testing Methods Development for Endocrine Disrupters," 6th Meeting of the Task Force on Endocrine Disrupters Testing and Assessment (EDTA), Tokyo, Ministry of Economy, Trade and Industry, Japan, Jun. 24-25, 2002, 70 pages.
Momentive Specialty Chemicals Inc.., "EPON™ and EPI-REZ™ Epoxy Resins," Product Aug. 2013, 16 pages.
Moss G.P., "Extension and Revision of the Von Baeyer System for Naming Polycyclic Compounds (Including Bicyclic Compounds)," Pure and Applied Chemistry, 1999, vol. 71 (3), pp. 513-529.
Olsen C.M., et al., "Effects of the Environmental Oestrogens Bisphenol A, Tetrachlorobisphenol A, Tetrabromobisphenol A, 4-Hydroxybiphenyl and 4,4'-Dihydroxpiphenyl on Oestrogen Receptor Binding, Cell Proliferation and Regulation of Oestrogen Sensitive Proteins in the Human Breast Cancer Cell Line MCF-7," Pharmacology and Toxicology, Apr. 2003, vol. 92 (4), pp. 180-188.
Parent Application, U.S. Appl. No. 13/651,796, Evans et al., filed Oct. 15, 2012.
Polycarbonates, 4th-5th Edition, Kirk-Othmer Encyclopedia of Chemical Technology, 2000, pp. 1-30.
Poly(p-phenylene oxide), Wikipedia: The Free Encyclopedia, accessed Apr. 6, 2015, http://en.wikipedia.org/wiki/Poly(p-phenylene_oxide, 3 pages.

(56) References Cited

OTHER PUBLICATIONS

Porter D.S., et al., "Hot-Fill Containers," New Tech for OPP & PET, Plastics Technology, Eastman Chemical Co., Dec. 2007, 6 pages.
Ravdin, et al., "Estrogenic Effects of Phenolphthalein on Human Breast Cancer Cells In Vitro," Breast Cancer Research and Treatment, Jun. 1987, vol. 9 (2), pp. 151-154.
Rosenmai, et al., "Are Structural Analogues to Bisphenol a Safe Alternatives?," Toxicological Sciences, vol. 139 (1), 2014, pp. 35-47.
Song K.H., et al., "Endocrine Disrupter Bisphenol a Induces Orphan Nuclear Receptor Nur77 Gene Expression and Steroidogenesis in Mouse Testicular Leydig Cells," Endocrinology, Jun. 2002, vol. 143 (6), pp. 2208-2215.
Soto A.M., "Evidence of Absence: Estrogenicity Assessment of a New Food-Contact Coating and the Bisphenol Used in Its Synthesis," Environmental Science and Technology, 2017, vol. 51 (3), pp. 1718-1726.
Extended European Search Report for Application No. 18166398.0, dated Oct. 26, 2018, 6 pages.
Olin North America Epoxy Resins (2016) brochure available at: https://www.brenntag.com/media/documents/bsi/product_data_sheets/material_science/olin_epoxy_resins/olin_epoxy_resins_brochure.pdf, 12 pages.
Extended European Search Report for Application No. 18150643.7, dated Oct. 26, 2018, 6 pages.
International Preliminary Report on Patentability for Application No. PCT/US2013/054132, dated Feb. 19, 2015, 8 pages.
International Preliminary Report on Patentability for Application No. PCT/US2015/025723, dated Oct. 27, 2016, 11 pages.
Supplementary European Search Report for Application No. 11769696.3, dated Jun. 27, 2014, 7 pages.
Supplementary European Search Report for Application No. 13746877.3, dated Nov. 30, 2015, 8 pages.
Supplementary Partial European Search Report for Application No. 15779232.6, dated Oct. 17, 2017, 14 pages.
Tice R.R. , "The Single Cell Gel/Comet Assay: A Microgel Electrophoretic Technique for the Detection of DNA Damage and Repair in Individual Cells," Environmental Mutagenesis, 1995, pp. 315-339.
U.S. Food and Drug Administration, "Bisphenol A (BPA): Use in Food Contact Application," 9 pages, [retrieved on Dec. 28, 2017]. Retrieved from the Internet [URL: www.fda.gov/newsevents/publichealthfocus/ucm064437.htm].
Vinas P., et al., "Comparison of Two Derivatization-Based Methods for Solid-Phase Microextraction-Gas Chromatography-Mass Spectrometric Determination of Bisphenol A, Bisphenol S and Biphenol Migrated from Food Cans," Analytical and Bioanalytical Chemistry, Feb. 2010, vol. 397 (1), pp. 115-125.
Vogel S., "A Non-Estrogenic Alternative to Bisphenol A at Last?," Environmental Defense Fund, (A blog post dated Jan 23, 2017), 6 pages.
Woo B.G., et al, "Melt Polycondensation of Bisphenol A Polycarbonate by a Forced Gas Sweeping Process," Industrial & Engineering Chemistry Research, Feb. 2001, vol. 40 (5), pp. 1312-1319.
Supplementary European Search Report for EP Application No. 16862969.9 dated Jul. 1, 2019, 7 pages.
Epoxy Resins, J.S. Massingill, pp. 393-424, Applied Polymer Science: 21st Century, 2000 (the year of publication is sufficiently earlier than the effective U.S. filing date and any foreign priority date so that the particular month of publication is not needed).

\* cited by examiner

LIQUID EPOXY RESIN COMPOSITION USEFUL FOR MAKING POLYMERS

CROSS-REFERENCE TO RELATED APPLICATION(S)

This application claims the benefit of U.S. Provisional Application No. 62/250,217 filed on Nov. 3, 2015 and entitled "Liquid Epoxy Resin Composition Useful For Making Polymers," which is incorporated herein by reference in its entirety.

BACKGROUND OF THE INVENTION

Various polymers are conventionally made using diepoxide reactants reacted with extender compounds to build molecular weight. For example, epoxy polymers made by reacting bisphenol A ("BPA") with the diglycidyl ether of BPA ("BADGE") are used in a variety of polymer end use applications, including in coating compositions for use in preventing or inhibiting the corrosion of metals.

SUMMARY

The present invention provides a liquid epoxy resin composition that is preferably useful in making a polymer such as an aromatic polyether polymer. In some embodiments, such polymers are useful for formulating food or beverage container coatings, including food-contact food or beverage container coatings. The liquid epoxy resin composition is preferably storage stable under ambient conditions for at least 1 month, more preferably for at least 3 months, and even more preferably for at least 6 months or even a year or more. In preferred embodiments, the liquid epoxy resin composition is preferably substantially free, more preferably completely free, of materials having estrogenic activity greater or equal to that of bisphenol S ("BPS").

In one embodiment, a liquid epoxy resin composition is provided that is preferably substantially free of bisphenol A ("BPA"), bisphenol F ("BPF"), and BPS, including any epoxides thereof, and is derived from reactants including an epihalohydrin (more preferably epichlorohydrin) and a diphenol (more preferably a substituted diphenol, and even more preferably an ortho-substituted diphenol). The liquid epoxy resin composition preferably comprises less than 80 weight percent, if any, of n=0 diepoxide compounds derived from a diphenol, based on the total weight of any unreacted diphenol and any compounds including at least one structural unit derived from a diphenol.

In another embodiment, a liquid epoxy resin composition is provided that is preferably substantially free of BPA, BPF, BPS, including any epoxides thereof, and is derived from reactants including epichlorohydrin and tetramethyl bisphenol F ("TMBPF"). The liquid epoxy resin composition preferably comprises at least 85 weight percent of n=0 and n=1 TMBPF-containing diepoxide resins, based on the total weight of any compounds present including at least one structural unit derived from TMBPF and any unreacted TMBPF that may be present. The liquid epoxy resin composition also preferably includes less than 80 weight percent of n=0 TMBPF-containing diepoxide resins, based on the total weight of compounds present including at least one structural unit derived from TMBPF and any unreacted TMBPF that may be present. Preferably, liquid epoxy resin composition includes less than 5 weight percent, if any, of TMBPF-containing mono-epoxide resins.

In yet another embodiment, a polyether polymer is provided that is a reaction product of ingredients including the liquid epoxy resin composition of the present invention. In a preferred such embodiment, the polyether polymer is an aromatic polyether polymer preferably having a number average molecular weight (Mn) of at least 2,000, or at least 4,000 and a glass transition temperature (Tg) of at least 60° C., or at least 70° C.

In yet another embodiment, a process is provided that includes reacting an epihalohydrin (preferably epichlorohydrin) and a diphenol (preferably a substituted diphenol, more preferably an ortho-substituted diphenol, and even more preferably tetramethyl bisphenol F) in a molar ratio (epichlorohydrin:diphenol) of from about 7:1 to about 1:1, more preferably from about 6:1 to about 1.01:1, and even more preferably from about 5:1 to about 3:1 to provide a liquid epoxy resin composition of the present invention.

The above summary of the present invention is not intended to describe each disclosed embodiment or every implementation of the present invention. The description that follows more particularly exemplifies illustrative embodiments. In several places throughout the application, guidance is provided through lists of examples, which can be used in various combinations. In each instance, the recited list serves only as a representative group and should not be interpreted as an exclusive list.

The details of one or more embodiments of the invention are set for in the description below. Other features, objects, and advantages of the invention will be apparent from the description and from the claims.

Selected Definitions

Unless otherwise specified, the following terms as used herein have the meanings as provided below.

The term "substantially free" of a particular compound means that the compositions of the present invention contain less than 1,000 parts per million (ppm) of the recited compound. The term "essentially free" of a particular compound means that the compositions of the present invention contain less than 100 parts per million (ppm) of the recited compound. The term "completely free" of a particular compound means that the compositions of the present invention contain less than 20 parts per billion (ppb) of the recited compound. In the context of the aforementioned phrases, the compositions of the present invention contain less than the aforementioned amount of the compound whether the compound itself is present in unreacted form or has been reacted with one or more other materials.

Unless otherwise indicated, the term "polymer" includes both homopolymers and copolymers (i.e., polymers of two or more different monomers).

The term "comprises" and variations thereof do not have a limiting meaning where these terms appear in the description and claims.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a coating composition that comprises "an" additive can be interpreted to mean that the coating composition includes "one or more" additives.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 1 to 2, etc.).

DETAILED DESCRIPTION

The present invention pertains to epoxy resin compositions that are preferably present in liquid form at ambient conditions. In preferred embodiments, the liquid epoxy resin compositions are storage stable under ambient conditions for extended periods of time without the need for any special precautions. For example, preferred liquid epoxy resin compositions of the present invention are storage stable for at least 1 month, more preferably at least 3 months, and even more preferably at least 6 months or at least 1 year, when stored under ambient conditions (e.g., atmospheric pressure and ambient temperature such as, for example, about 15-25° C.).

During the course of the aforementioned storage periods in ambient environments, preferred storage stable epoxy resin compositions remain a homogenous liquid that is appreciably free of crystalline epoxy resin, and which can be used to make a polyether polymer without the need for any special process steps to return the sample to a usable liquid form and/or appreciably non-crystalline form. The presence of more than a trace amount of eye-visible crystals in the liquid epoxy resin composition is indicative of a composition that is not storage stable. Similarly, a composition that is a "solid" or for which a viscosity cannot be measured (e.g., using a Brookfield thermocel) is not storage stable. By way of example, a liquid epoxy resin that is clear (e.g., is free of any haze visible to the unaided human eye) and does not include suspended crystals visible to the unaided human eye is appreciably free of crystalline epoxy resin. Such a liquid epoxy resin may contain a small amount of crystals located at interfaces (e.g., an interface between the liquid and the surface of the storage vessel) and still be considered appreciably free of crystalline epoxy resin. The liquid epoxy resin compositions described herein typically do not constitute a pure sample of a particular type of diepoxide resin, but rather a mixture of two or more different diepoxide resins (and, in some embodiments, three or more different diepoxide resins, or even four or more different diepoxide resins). In addition, amounts of mono-epoxide compounds, unreacted starting compounds, reaction intermediates, and/or reaction byproducts may also be present provided the presence of such compounds does not unsuitably interfere with either: (i) the storage stability of the liquid epoxy resin composition in ambient environments or (ii) the preparation of polyether polymers from the liquid epoxy resin composition.

The liquid epoxy resin composition can be prepared by reacting one or more epihalohydrins with one or more diphenol compounds, more typically one or more substituted diphenols, even more typically one or more ortho-substituted diphenols, and even more typically one or more ortho-substituted bisphenols. Typically, all, or substantially all, of the epoxy resin present in the liquid coating composition will be derived from diphenols, more typically ortho-substituted diphenols. If desired, mixtures of different diphenol compounds may be employed, although in presently preferred embodiments a single type of diphenol is used. Moreover, although not presently preferred, it is contemplated that some epoxy resin (e.g., mono-epoxide resins and/or polyepoxide resins) may optionally be present that is not derived from a diphenol—such as, e.g., one or more aliphatic epoxy resins (e.g., epoxides derived from aliphatic materials such as aliphatic diols or diacids).

Suitable epihalohydrins that can be used herein include those represented by the following formula:

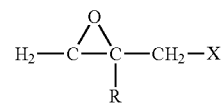

wherein R is hydrogen or a hydrocarbyl group having from 1 to about 4 carbon atoms and X is a halogen, preferably chlorine or bromine. Epichlorohydrin is a preferred epihalohydrin for use in the present invention.

Throughout this disclosure, diepoxide resins (sometimes referred to as "diepoxides" for brevity) are discussed in the context of diepoxides that are n=0, n=1, n=2, n=3, and so on. In this context, the integer value of "n" refers to the additional structural units (beyond the base structural unit derived from a diphenol), if any, present in the diepoxide that are derived from a diphenol. To further illustrate these concepts, the diglycidyl ether of tetramethyl bisphenol F produced via reaction of epichlorohydrin with tetramethyl bisphenol F ("TMBPF"), in which n is an integer value such as 0, 1, 2, or 3 or more, is shown below.

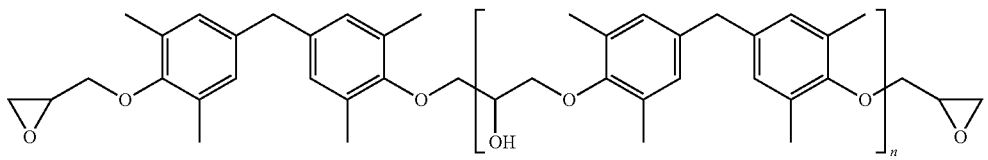

Thus, as can be seen from the above structural representation, when n is 0, a single structural unit derived from TMBPF is present, whereas when n is 1, two such structural units are present; when n is 2, three such structural units are present; when n is 3, four such structural units are present; and so on. As shown above, when two or more structural units derived from a diphenol are present, the structural units are typically attached to one another via a —CH$_2$—CH(OH)—CH$_2$— segment. In certain instances, the attachment may alternatively be a —CH$_2$—CH$_2$—CH(OH)— segment.

When n is 1 or more, the diepoxide will typically have structural units that are derived from the same type of diphenol compound. Nonetheless, it is contemplated that a given diepoxide may have structural units derived from two or more different diphenol compounds. For example, for an n=1 diepoxide, one structural unit may be derived from a first diphenol (e.g., an ortho-substituted bisphenol such as, e.g., TMBPF) and another structural unit may be derived from a second diphenol having a different chemical structure (e.g., an ortho-substituted diphenol having a single phenylene group such as, e.g., 2,5-di-tert-butyl hydroquinone).

In particular, it has been discovered that for certain diphenols (e.g., certain ortho-substituted diphenols), the amount of n=0 diepoxide resin present in the composition can affect the storage stability of the composition and/or whether the composition is a liquid at ambient conditions. In particular, it is believed that if the amount of n=0 diepoxide resin is too high, it can lead to excessive crystallinity and, in turn, insufficient storage stability at ambient conditions (and even elevated temperature conditions). For example, in generating a diepoxide resin composition using epichlorohydrin and TMBPF, it was found that when the epoxide resin composition was greater than 85% n=0 diepoxide, the resulting composition could only be stored for a couple of days, at most, at ambient conditions before excessive crystallinity resulted that would require special process steps before being usable as a reactant in a commercial resin reactor for polyether polymer production. Such additional process steps are disadvantageous because such steps can increase manufacturing complexity, slow cycle time, and/or result in other additional manufacturing costs (e.g., additional energy costs associated with high temperature process steps aimed at avoiding and/or reducing the crystallinity issue during storage and/or prior to polymer manufacture).

Thus, the amount of n=0 diepoxide resin present in the epoxy resin composition is preferably controlled so that it is sufficiently low to yield a storage stable liquid composition that is useful for making high quality polyether polymers. A useful expression for assessing the pertinent amount of n=0 diepoxide resin present in the liquid epoxy resin composition is the weight ratio (or percentage) of: (i) n=0 diepoxide resin derived from a diphenol relative to (ii) the total weight of any compounds present in the liquid epoxy resin composition that include at least one structural unit derived from a diphenol and any residual diphenol that may be present. Thus, for example, if the following compounds derived from a diphenol are present in the indicated weight part amounts in the liquid epoxy resin composition, then the pertinent n=0 diepoxide amount is 75 weight percent (wt-%):

75 parts n=0 diepoxide resin derived from a diphenol;
15 parts n=1 diepoxide resin derived from a diphenol;
4 parts n=2 diepoxide resin derived from a diphenol;
2 parts n=3 diepoxide resin derived from a diphenol;
3 parts mono-epoxide derived from a diphenol; and
1 part unreacted diphenol.

Unless specifically defined otherwise, the % n=0, n=1, n=2, and n=3 (and so on) diepoxide should be interpreted pursuant to the weight percent expression described in the preceding paragraph.

An example of a suitable approach for assessing the amount of each of the different "n" diepoxide resins that may be present in the liquid epoxy resin composition is the HPLC method described in the below Test Methods section.

The liquid epoxy resin composition preferably includes less than about 80 wt-%, if any, of n=0 diepoxide resin, more preferably less than about 75 wt-% or less than about 70 wt-%. Typically, the composition will include at least about 50 wt-%, preferably more than 60 wt-%, even more preferably more than 65 wt-%, and in some instances more than 70 wt-% of n=0 diepoxide resin.

While not intending to be bound by any theory, it is believed it is advantageous to include more than 50 wt-%, and more preferably more than 60 wt-% of n=0 diepoxide resin to avoid the viscosity of the liquid epoxy resin composition being unsuitably high.

The liquid epoxy resin composition typically includes more than 5 wt-% of n=1 diepoxide resin. Preferably, the composition includes at least 10 wt-% of n=1 diepoxide resin, more preferably at least 15 wt-% or at least 20 wt-% of n=1 diepoxide resin. While the top end amount of n=1 diepoxide resin present in the composition is not restricted, typically the composition will include less than about 25 wt-% of such compounds, and in some instances less than about 20 wt-% of such compounds.

In preferred embodiments, the n=0 and n=1 diepoxide resins are present in the liquid epoxy resin composition in a sufficiently high amount such that the combined n=0 and n=1 weight percent is at least 80 wt-%, more preferably at least 85 wt-%, and even more preferably at least 95 wt-%. Although it is contemplated that some epoxide compounds that are not derived from a diphenol (e.g., aliphatic diepoxides derived from materials such as, e.g., cyclohexane dimethanol or tetramethyl cyclobutanediol) may be included in the liquid epoxy resin composition, typically all or substantially all of the epoxide material present (other than any residual unreacted epihalohydrin) is derived from a diphenol.

The amount of n≥2 diepoxide resin (e.g., n=2 and n=3 diepoxide resin) is preferably also controlled to provide a liquid epoxy resin composition having the balance of desired properties. While not intending to be bound by theory, it is believed that the presence of too much n≥2 epoxide resins can contribute to the epoxy composition lacking suitable storage stability and may even cause the epoxy resin composition to be a solid at ambient conditions. Thus, the amount of n≥2 epoxide resins, if any such resin(s) are present, is preferably controlled to avoid such problems.

A table is provided below offering guidance on the amount of certain components, if any, that may be present in preferred liquid epoxy compositions of the present disclosure. The below disclosure is intended as a disclosure for both (i) each component concentration threshold separately and (ii) any possible combination of component concentration thresholds.

| Component | Preferred | More Preferred | Even More Preferred |
|---|---|---|---|
| Water | ≤1 wt-% | ≤0.05 wt-% | ≤0.02 wt-% |
| Hydrolyzable Chloride (HCC) | ≤1 wt-% | ≤0.05 wt-% | ≤0.02 wt-% |
| Residual Epichlorohydrin | ≤50 ppm | ≤10 ppm | ≤1 ppm |
| Residual Diphenol | 10,000 ppm | 5,000 ppm | 1,000 ppm |
| Mono-epoxide Compounds | ≤5 wt-% | ≤3 wt-% | ≤2 wt-% |
| n ≥ 2 Diepoxide Compounds | ≤10 wt-% | ≤5 wt-% | ≤3 wt-% |

The liquid epoxy resin composition may have any suitable viscosity. In preferred embodiments, the liquid epoxy resin composition has a viscosity at 52° C. of less than 10,000 centiPoise (cP), preferably less than 5,000 cP, and even more preferably less than 2,000 cP. An example of a suitable viscosity measuring apparatus is a Brookfield thermocel equipped with a suitable spindle and the revolutions per minute adjusted to take up most of the measuring scale for the apparatus. In presently preferred embodiments, the liquid epoxy resin has a viscosity falling with one or all of the aforementioned ranges after storage for an extended period under ambient conditions (e.g., after storage under ambient conditions for at least one month, more preferably after storage under ambient conditions for a least 6 months or 1 year or more).

Weight per epoxide equivalent is another measure that may be useful for assessing the relative amounts of the various "n" epoxy resins that may be present in the liquid epoxy resin composition. For example, while not intending to be bound by any theory, it is believed that it is desirable that the final weight per epoxide equivalent of the liquid epoxy resin composition be within about 10% to about 20% of the theoretical weight per epoxide equivalent for the n=0 diepoxide resin, more preferably within about 13% to about 17%. If more than one diphenol is used and the diphenols have different molecular weights, then the above percentages would be interpreted in the context of an average value factoring the ratio of the particular diphenol reactants employed and their corresponding n=0 diepoxide resins. In embodiments in which TMBPF is the sole diphenol used, the weight per epoxide equivalent of the liquid epoxy resin composition is preferably about 200 to about 220 grams/epoxy equivalents, more preferably about 208 to about 218 grams/epoxy equivalents.

As previously discussed, in preferred embodiments, a substituted diphenol is used to form the liquid epoxy resin composition, more typically an ortho-substituted diphenol, and even more typically an ortho-substituted bisphenol. Organic groups are preferred substituent groups, with alkyl groups being preferred, and methyl groups in particular being preferred ortho-substituent groups. In some embodiments, two aromatic rings of the bisphenol having a hydroxyl group attached thereto are connected to each other via a —CH$_2$— linking group.

Preferred ortho-substituted diphenols for use in forming the liquid epoxy resin composition of the present invention have the below structure:

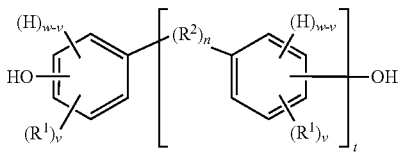

wherein:
H denotes a hydrogen atom, if present;
each $R^1$ is an organic group, more preferably an alkyl group that is preferably substantially non-reactive with an epoxy group;
v is 1 to 4;
n is 0 or 1;
$R^2$, if present, is preferably a divalent group, more preferably a —CH$_2$— group; and
t is 0 or 1;
two or more $R^1$ and/or $R^2$ groups can optionally join to form one or more cyclic groups.

Preferably, at least one $R^1$ on each depicted phenylene ring is located at an ortho position on the ring relative to the hydroxyl group. In certain preferred embodiments, v is 2 to 4, more preferably 2, and an $R^1$ is located at each ortho position on the ring relative to the hydroxyl group. Methyl groups are presently preferred ortho $R^1$ groups. Other suitable ortho $R^1$ groups may include ethyl, propyl, propyl, butyl, and isomers thereof (e.g., t-butyl).

A preferred ortho-substituted diphenol in which t is 1 (i.e., a bisphenol) is provided below, which is commonly referred to as tetramethyl bisphenol F.

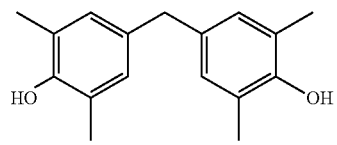 [SMILES: Cc1cc(Cc2cc(C)c(O)c(C)c2)cc(C)c1O]

Typically, the diphenol will be a bisphenol, although it is contemplated that diphenols in which t is 0 may also be used. An example of an ortho-substituted diphenol in which t is 0 is provided below, which is commonly referred to as 2,5-di-t-butyl hydroquinone.

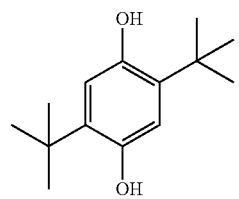 [SMILES: CC(C)(C)c1cc(O)c(C(C)(C)C)cc1O]

It is contemplated that any of the diphenol compounds described in U.S. Pub. Nos. 2013/0206756 or 2015/0021323 may be used, with diphenol compounds that are appreciably non-estrogenic being particularly preferred. In preferred embodiments, the liquid epoxy resin composition does not include any structural units derived from bisphenol A ("BPA"), bisphenol F ("BPF"), bisphenol S ("BPS"), or any diepoxides thereof (e.g., diglycidyl ethers thereof such as the diglycidyl ether of BPA ("BADGE")). In addition, the liquid epoxy resin composition preferably does not include any structural units derived from a dihydric phenol, or other polyhydric phenol, having estrogenic agonist activity greater than or equal to that of 4,4'-(propane-2,2-diyl)diphenol. More preferably, the liquid epoxy resin composition does not include any structural units derived from a dihydric phenol, or other polyhydric phenol, having estrogenic agonist activity greater than or equal to that of BPS. Even more preferably, the liquid epoxy resin composition does not include any structural units derived from a dihydric phenol, or other polyhydric phenol, having estrogenic agonist activity greater than 4,4'-(propane-2,2-diyl)bis(2,6-dibromophenol). Optimally, the liquid epoxy resin composition does not include any structural units derived from a dihydric phenol, or other polyhydric phenol, having estrogenic agonist activity greater than 2,2-bis(4-hydroxyphenyl)propanoic acid. In such preferred embodiments, the liquid epoxy resin composition is also preferably free of such unreacted bisphenol monomers having the properties described above. A useful method for assessing the estrogenic agonist activity (e.g., whether a diphenol is appreciably non-estrogenic) is the MCF-7 assay described in U.S. Pub. No. 2013/0206756.

If desired, one or more diluents or other materials may be present in the liquid epoxide resin composition. For example, organic solvent may be included in the liquid epoxide resin composition. The amount and identity of such diluents or other materials are preferably controlled to avoid unsuitably interfering with downstream polymerization reactions that may be used to form a polymer from reactants including the liquid diepoxide resin composition.

In some embodiments, the liquid epoxy resin composition constitutes at least 90% by weight of diepoxide resin, more preferably at least 93% by weight of diepoxide resin, and even more preferably at least 96% by weight of diepoxide resin, based on the total weight of the liquid epoxy resin composition.

The meaning of the term "liquid" in the context of an epoxy resin composition at ambient conditions should be readily understood by those of ordinary skill in the pertinent art. However, to further illustrate the meaning of the term "liquid" in this context, a non-limiting example follows. For convenience, the test method described below will be referred to hereinafter as the "Pour Test." 50 grams of an epoxy resin composition to be assessed is weighed into a standard 100 milliliter glass beaker (e.g., a cylindrical 100 milliliter Pyrex beaker having vertical side walls about 6.5 centimeters in height) under ambient conditions (e.g., atmospheric pressure and a temperature of 22° C.). The filled beaker is turned upside down such that it is vertical and positioned immediately above a receiving vessel. Preferably, the liquid epoxy resin composition has begun flowing out of the initial beaker (e.g., beyond its outer rim) within 180 minutes or less after being turned upside down, and more preferably substantially sooner (e.g., 120 minutes or less, 60 minutes or less, 30 minutes or less, 15 minutes or less, 10 minutes or less, etc.). Epoxy resin compositions that have not begun flowing out within 180 minutes are less preferred due to difficulties associated with handling and using to form a polymer suitable for use in formulating preferred coating compositions described herein.

Any suitable method may be used to prepare a liquid epoxy resin composition having the desired population of "n" diepoxide resins described herein. Such methods may even include, for example, conversion processes (e.g., selective filtration, etc.) capable of taking an "out-of-specification" epoxy resin composition and converting it into an "in-specification" liquid epoxy resin composition. Due to the potential costs associated with such conversions, the inventors have found it convenient to use a synthesis process tailored to yield a liquid epoxy resin composition that is "in specification." A representative such synthesis process is described in the following discussion and exemplified in the Examples section, although it is contemplated that other suitable processes may also be used.

In forming the liquid epoxy resin composition, the epihalohydrin (which is preferably epichlorohydrin) is preferably used in a stoichiometric excess relative to the diphenol, although the amount of the excess is preferably controlled to keep the n=0 diepoxides below about 80 wt-%. While not intending to be bound by theory, it is believed that if the amount of excess epihalohydrin is too high, it can result in the presence of an excessive amount of n=0 diepoxide, which can lead to excessive crystallinity and even solidification, thereby making it necessary to employ special (and more costly) measures to enable manufacture of polyether polymer from the diepoxide. For example, it was discovered that if epichlorohydrin is used in a very large stoichiometric excess relative to the diphenol in making an epoxy resin composition from epichlorohydrin and TMBPF, the resulting liquid resin composition is greater than 85% n=0 diepoxide resin and the resulting liquid composition is not storage stable beyond a couple days, at most, due to crystallinity issues.

In the non-limiting, representative synthesis process disclosed herein, the epihalohydrin(s) and the diphenol compound(s) are preferably employed in a molar ratio of from about 7:1 to about 1:1, more preferably from about 6:1 to about 1.01:1, and even more preferably from about 5:1 to about 3:1. In one embodiment, a molar ratio of about 4:1 is used. It is contemplated that such molar ratios may also be used in other suitable synthesis processes.

If desired, a coupling catalyst may be used to facilitate reaction of the epihalohydrin and diphenol. An example of a suitable such catalyst is an ammonium chloride salt such as, e.g., butyl trimethyl ammonium chloride. Such catalysts may be included at any suitable concentration level in the reaction mixture, including from about 2% to about 10% weight percent relative to the level of the diphenol reactant (e.g., TMBPF) in the reaction mixture.

Typically, the synthesis process will include one or more (or all) of the following steps after reaction of the epihalohydrin (typically epichlorohydrin) and diphenol has completed or is well underway: (i) removing excess epihalohydrin in one or more steps (e.g., via application of vacuum and/or heat), (ii) dehydrohalogenating the composition in one or more steps (before and/or after removing any excess epihalohydrin) to achieve a suitably low level of hydrolyzable chloride content, and (iii) washing out salts (e.g., NaCl via an aqueous work-up) that may have been generated in any dehydrohalogenating step(s). Suitable dehydrohalogenating agents that can be employed include alkali metal hydroxides such as, for example, sodium hydroxide, potassium hydroxide, lithium hydroxide, and mixtures thereof.

It is contemplated that the liquid epoxy resin composition may be used to make any type of polymer in which a diepoxide reactant is typically used, including, for example, polymers for use in the coatings or adhesives industries. The liquid diepoxide resin compositions disclosed herein are particularly useful for use in making polyether polymers for use in the coating industry, including the types of polyether binder polymers used to formulate coating compositions intended for use on the interior or exterior surfaces of food or beverage containers (e.g., metal food or beverage cans or portions thereof). Such polyether polymers, including suitable ingredients and processes for use in making such polymers, are described in U.S. Pub. Nos. 2013/0206756 and 2015/0021323.

In general, the molecular weight of the diepoxide resin composition is "upgraded" via reaction with one or more extender compounds to yield a polyether polymer having the desired molecular weight and balance of other desired characteristics. Examples of suitable such extenders may include polyols (with diols being preferred and diphenols being particularly preferred), polyacids (with diacids being preferred), or phenol compounds having both a phenol hydroxyl group and a carboxylic group (e.g., para hydroxyl benzoic acid and/or para hydroxy phenyl acetic acid). In some embodiments, catechol, hydroquinone, resorcinol, a substituted variant thereof, or mixtures thereof, are preferred extenders.

The polyether polymers may be made in a variety of molecular weights. Preferred polyether polymers have a number average molecular weight (Mn) of at least 2,000, more preferably at least 3,000, and even more preferably at least 4,000. The molecular weight of the polyether polymer may be as high as is needed for the desired application. Typically, however, the Mn of the polyether polymer, when adapted for use in a liquid coating composition, will not exceed about 11,000. In some embodiments, the polyether polymer has a Mn of about 5,000 to about 8,000. In embodiments where the polymer is a copolymer, such as for example a polyether-acrylic copolymer, the molecular weight of the overall polymer may be higher than that recited above, although the molecular weight of the polyether polymer portion will typically be as described above. Typically, however, such copolymers will have a Mn of less than about 20,000.

The polyether polymer may exhibit any suitable polydispersity index (PDI). In embodiments in which the polymer is a polyether polymer intended for use as a binder polymer of a liquid applied packaging coating (e.g., a food or beverage can coating), the polyether polymer will typically exhibit a PDI of from about 1.5 to 5, more typically from about 2 to 3.5, and in some instances from about 2.2 to 3 or about 2.4 to 2.8.

In certain preferred embodiments, the polyether polymer is suitable for use in formulating (e.g., as the primary binder polymer) a food-contact packaging coating. In order to facilitate a suitable balance of coating properties for use as a food-contact packaging coating, including suitable corrosion resistance when in prolonged contact with packaged food or beverage products which may be of a corrosive nature, the polymer preferably has a glass transition temperature ("Tg") of at least 60° C., more preferably at least 70° C., and even more preferably at least 80° C. In preferred embodiments, the Tg is less than 150° C., more preferably less than 130° C., and even more preferably less than 110° C. Tg can be measured via differential scanning calorimetry ("DSC") using the methodology disclosed in the Test Methods section. In preferred embodiments, the polymer is a polyether polymer exhibiting a Tg pursuant to the aforementioned Tg values. It is contemplated that, in some embodiments, such as, for example, where the coating composition is intended for use as an exterior varnish on a food or beverage container, the Tg of the polymer may be less than that described above (e.g., as low as about 30° C.).

While not intending to be bound by any theory, it is believed that the inclusion of a sufficient number of aryl and/or heteroaryl groups (typically phenylene groups) in the polyether polymer may be an important factor for achieving suitable coating performance for food-contact packaging coatings, especially when the product to be packaged is a so called "hard-to-hold" food or beverage product. Sauerkraut is an example of a hard-to-hold product. In preferred embodiments, aryl and/or heteroaryl groups constitute at least 25 wt-%, more preferably at least 30 wt-%, even more preferably at least 35 wt-%, and optimally at least 45 wt-% of the polyether polymer, based on the total weight of aryl and heteroaryl groups in the polymer relative to the weight of the polyether polymer. The upper concentration of aryl/heteroaryl groups is not particularly limited, but preferably the amount of such groups is configured such that the Tg of the polyether polymer is within the Tg ranges previously discussed. The total amount of aryl and/or heteroaryl groups in the polyether polymer will typically constitute less than about 80 wt-%, more preferably less than 75 wt-%, even more preferably less than about 70 wt-%, and optimally less than 60 wt-% of the polyether polymer. The total amount of aryl and/or heteroaryl groups in the polyether polymer can be determined based on the weight of aryl- or heteroaryl-containing monomer incorporated into the polyether polymer and the weight fraction of such monomer that constitutes aryl or heteroaryl groups. In embodiments where the polymer is a polyether copolymer (e.g., a polyether-acrylic copolymer), the weight fraction of aryl or heteroaryl groups in the polyether polymer portion(s) of the copolymer will generally be as described above, although the weight fraction relative to the total weight of the copolymer may be less.

Preferred aryl or heteroaryl groups include less than 20 carbon atoms, more preferably less than 11 carbon atoms, and even more preferably less than 8 carbon atoms. The aryl or heteroaryl groups preferably have at least 4 carbon atoms, more preferably at least 5 carbon atoms, and even more preferably at least 6 carbon atoms. Substituted or unsubstituted phenylene groups are preferred aryl or heteroaryl groups. Thus, in preferred embodiments, the polyether fraction of the polymer includes an amount of phenylene groups pursuant to the amounts recited above.

In some embodiments, at least 25%, at least 50%, or even at least 60% by weight of the polyether polymer constitutes structural units derived from the liquid epoxy resin composition.

Test Methods

Unless indicated otherwise, the following test methods were utilized in the Examples that follow.

Hydrolyzable Chloride Content (HCC)

The HCC was determined using Test Method A of ASTM D1726-11 entitled "Standard Test Methods for Hydrolyzable Chloride Content of Liquid Epoxy Resins."

HPLC Determination of % Particular Diepoxide Resin

The liquid epoxy resin at a nominal concentration of 10,000 ppm (1%) was prepared in acetonitrile. This was diluted to 100 ppm with acetonitrile:water (50:50 v/v). The sample was analyzed by liquid chromatography with ultraviolet detection (LC/UV) using a Series 200 high performance liquid chromatograph (HPLC) (PerkinElmer, Waltham, Mass.) with the following conditions:

Column: Phenomenex Gemini C18 3 μm 3.0×150 mm
Column Temperature: 35° C.
Injection volume: 25 μL
Detection: UV at 233 nm (can be adjusted depending on the diphenol)
Mobile Phase: Organic=Acetonitrile (ACN)
Aqueous=Water
Gradient Program (total run time=50 min):

| LC Gradient Profile | | | | |
|---|---|---|---|---|
| Time (min) | Flow (mL/min) -- | % ACN | % Water | Curve |
| Initial | 0.4 | 50 | 50 | — |
| 30.00 | 0.4 | 100 | 0 | Linear |
| 40.00 | 0.4 | 100 | 0 | Hold |
| 50.00 | 0.4 | 50 | 50 | Step |

The structure of each peak is determined by Chemical ionization mass spectrometry. The weight percent of each peak is assumed to be proportional to the area under each peak.

Differential Scanning Calorimetry

Samples for differential scanning calorimetry ("DSC") testing are prepared by first applying the liquid resin composition onto aluminum sheet panels. The panels are then baked in a Fisher Isotemp electric oven for 20 minutes at 300° F. (149° C.) to remove volatile materials. After cooling to room temperature, the samples are scraped from the panels, weighed into standard sample pans and analyzed using the standard DSC heat-cool-heat method. The samples are equilibrated at −60° C., then heated at 20° C. per minute to 200° C., cooled to −60° C., and then heated again at 20° C. per minute to 200° C. Glass transitions are calculated from the thermogram of the last heat cycle. The glass transition are measured at the inflection point of the transition.

EXAMPLES

The invention is illustrated by the following examples. It is to be understood that the particular examples, materials, amounts, and procedures are to be interpreted broadly in accordance with the scope and spirit of the inventions as set forth herein. Unless otherwise indicated, all parts and percentages are by weight and all molecular weights are weight average molecular weight. Unless otherwise specified, all chemicals used are commercially available from, for example, Sigma-Aldrich, St. Louis, Mo.

Comparative Example A 375.3 parts of epichlorohydrin were added to a 4-neck flask equipped with a mechanical stirrer, nitrogen inlet, reflux condenser, and a heating mantle equipped with a thermocouple and temperature controlling device. The setup was inerted with nitrogen, stirring was begun and 86.6 parts of TMBPF was added. Once the mixture was homogeneous, it was heated to 85° C., at which time 8.4 parts of a 60% solution of Butyl trimethyl ammonium chloride in water was added over approximately 1 hour to keep the temperature between 85-90° C. After the addition was complete, the mixture was held at 85-90° C. for 4 hours. At this point the mixture was tested by HPLC for residual TMBPF on the hour. When the residual TMBPF was less than 1% (which occurred after 8 hours), the reactor was cooled to 55° C., and 79 parts of 25% aqueous sodium hydroxide was added and held with agitation for 1 hour at 55° C. At this point agitation was stopped, and the layers were allowed to separate. When a relatively clean interface was observed, the salt water layer (bottom layer) was removed. Agitation was commenced and the organic layer was equilibrated at 55° C., and 30.4 parts of 25% aqueous sodium hydroxide was added. After agitation at 55° C. for 30 minutes, 36.5 parts of water was added, and held with agitation at 55° C. for 1 hour. Agitation was stopped, and the bottom layer was removed. The organic layer was tested for hydrolysable chloride content, which was determined to be less than 0.5% by weight. At this point, vacuum was applied slowly. When the vacuum reached greater than 25 inHg (inches of mercury), heat was slowly applied to reach 122° C. When epichlorohydrin stopped being collected, the material was tested for % epichlorohydrin. If the weight percent epichlorohydrin was less than 0.2% (if the value was greater than 0.2%, stripping was continued), vacuum was broken, the mixture was cooled to 55° C., and 250.3 parts of toluene and 30.9 parts isopropanol were added under agitation and heated to 55° C. 14.9 parts of 50% aqueous sodium hydroxide was added and mixed for 1 hour, then 17.9 parts water was added. The top layer was tested for % hydrolyzable chloride content (HCC). If the % HCC was less than 0.01%, the bottom layer was removed (if % HCC was 0.01%, additional caustic treatments were performed), and an equal volume of water was added. The two layers were heated to 50° C. with agitation for 30 minutes, at which time, agitation was stopped and the layers were allowed to separate. The bottom layer was removed and 124.3 parts of a 0.4% aqueous solution of monosodium phosphate was added. The layers were heated to 50° C. with agitation for 30 minutes. The bottom layer was removed and an equal volume of water was added and heated to 50° C. with agitation for 30 minutes. Agitation was stopped, the layers were allowed to separate, and the aqueous layer was removed. This was repeated until the organic layer was completely clear, indicating all the salt was washed out. At this point, the toluene was stripped out at 122° C. under vacuum, leaving a TMBPF diglycidyl ether resin composition with the properties indicated in Table 1.

TABLE 1

| Weight per Epoxide | 186.1 grams/equivalent |
|---|---|
| HCC | 0.01 weight percent (wt-%) |
| Water | 0.01 wt-% |
| Epichlorohydrin | 6.1 parts per million (ppm) |
| n = 0 diepoxide | 93.9%* |
| n = 1 diepoxide | 4.0%* |
| Form | Light brown solid |
| Melting point | 80° C. |

*Based on the weight of the indicated diepoxide derived from a diphenol relative to the total amount of unreacted diphenol and compounds containing at least one structural unit derived from a diphenol.

Example 1: Preparation of a Storage Stable Liquid Diepoxide Composition 168.22 parts of epichlorohydrin were added to a 4-neck flask equipped with a mechanical stirrer, nitrogen inlet, reflux condenser, and a heating mantle equipped with a thermocouple and temperature controlling device. The setup was inerted with nitrogen, stirring was begun and 116.53 parts of TMBPF was added. Once the mixture was homogeneous, it was heated to 85° C., at which time 2.81 parts of a 60% solution of Butyl trimethyl ammonium chloride in water was added over approximately 1 hour to keep the temperature between 85-90° C. After the addition was complete, the mixture was held at 85-90° C. for 40 hours. At this point the mixture is tested by HPLC for residual TMBPF on the hour. When the residual TMBPF is <1% (40 hours), the reactor is cooled to 55° C., and 106.2 parts of 25% aqueous sodium hydroxide was added and held with agitation for 1 hour at 55° C. At this point agitation was stopped, and the layers were allowed to separate. When a relatively clean interface was observed, the salt-water layer (bottom layer) was removed. Agitation was commenced and the organic layer was equilibrated at 55° C., and 40.95 parts of 25% aqueous sodium hydroxide was added. After agitation at 55° C. for 30 minutes, 49.14 parts of water was added, and held with agitation at 55° C. for 1 hour. Agitation was stopped, and the bottom layer was removed. The organic layer was tested for hydrolyzable chloride content. It was less than 0.5% by weight. At this point vacuum was applied slowly. When the vacuum reached less than 25 inHg, heat was slowly applied to reach 122° C. When epichlorohydrin stopped being collected, the material was tested for % epichlorohydrin. If weight percent of epichlorohydrin was less than 0.2% (if the value was greater than 0.2%, stripping was continued), vacuum was broken, the mixture was cooled to 55° C. and 336.6 parts of toluene and 41.6 parts isopropanol were added under agitation and heated to 55° C. 20.0 parts of 50% aqueous sodium hydroxide was added and mixed for 1 hour, then 24 parts water was added. The top layer was tested for % hydrolyzable chloride content (HCC). If the weight percent HCC was less than 0.01%, the bottom layer was removed (if wt-% HCC was greater than 0.01%, additional caustic treatments were performed), and an equal volume of water was added. The two layers were heated to 50° C. with agitation for 30 minutes, at which time, agitation was stopped and the layers were allowed to separate. The bottom layer was removed and 167.14 parts of a 0.4% aqueous solution of monosodium phosphate was added. The layers were heated to 50° C. with agitation for 30 minutes. The bottom layer was removed and an equal volume of water was added and heated to 50° C. with agitation for 30 minutes. Agitation was stopped, the layers were allowed to separate, and the aqueous layer was removed. This was repeated until the organic layer was completely clear, indicating all the salt was washed out. At this point, the toluene was stripped out at 122° C. under vacuum, leaving a TMBPF digylcidylether resin composition with the properties indicated below in Table 2. The liquid epoxy resin composition was storage stable under ambient conditions for more than 3 months and was viable for up to about 6 months of storage under ambient conditions.

TABLE 2

| Weight per Epoxide | 204.5 grams/equivalent |
|---|---|
| HCC | 0.01 weight percent (wt-%) |
| Water | less than 0.01 wt-% |
| Epichlorohydrin | 1.3 ppm |
| n = 0 diepoxide | 73.5%* |
| n = 1 diepoxide | 17.1%* |
| n = 2 diepoxide | 2.6%* |
| Mono-epoxide compounds | <5%* |
| Form | Liquid |

*Based on the weight of the indicated diepoxide derived from a diphenol relative to the total amount of unreacted diphenol and compounds containing at least one structural unit derived from a diphenol.

Example 2: Preparation of a Polyether Polymer 405.3 parts of the liquid epoxy resin from Example 1, 94.5 parts hydroquinone, 0.5 parts ethyl triphenyl phosphonium iodide, and 15.5 parts ethyl carbitol were added to a 4-neck flask equipped with a mechanical stirrer, nitrogen inlet, reflux condenser, and a heating mantle equipped with a thermocouple and temperature controlling device. The setup was inerted with nitrogen, stirring was begun and the batch was heated to 130° C. Heat was then turned off and the batch was allowed to exotherm to 180° C. The batch was stabilized at 160 C until the weight per epoxide was 2083. At this point the temperature was turned off and the following solvents were added sequentially: 106.5 parts cyclohexanone, 232.4 parts aromatic 100, and 145.3 parts PM acetate. The polyether polymer had a solids of 50% and a weight per epoxide of 2128, and a viscosity of 11,000 cps. When this polymer was formulated with resole phenolic resin, it had flexibility and corrosion resistance similar to food-contact can coating industry standards.

Example 3: Storage Stable Liquid Diepoxide Composition

A liquid epoxy resin synthesized using epichlorohydrin and TMBPF produced using a different method than that of Example 1 was provided. The properties of the liquid diepoxide resin composition of Example 3 are provided below in Table 3. The liquid epoxy resin composition was storage stable for an extended period of time (e.g., months) under ambient conditions. When tested using the Pour Test described herein, the liquid epoxy resin composition began pouring out of the beaker within approximately 5 to 10 minutes (after the beaker was turned upside-down) in a continuous "string" that broke at 126 minutes.

The liquid epoxy resin composition of Example 3 was used to successfully generate a polyether polymer (using the methods of Example 2 and other materials of Example 2) that was suitable for use in formulating an interior food or beverage can coating composition

TABLE 3

| Weight per Epoxide | 218 grams/equivalent |
|---|---|
| HCC | 0.04 weight percent (wt-%) |
| Water | less than 0.05 wt-% |
| Epichlorohydrin | 0 ppm |
| n = 0 diepoxide | 67.7%* |
| n = 1 diepoxide | 23.7%* |
| n = 2 diepoxide | 6.0%* |
| Mono-epoxide compounds | <5%* |
| Form | Liquid |

*Based on the weight of the indicated diepoxide derived from a diphenol relative to the total amount of unreacted diphenol and compounds containing at least one structural unit derived from a diphenol.

The complete disclosure of all patents, patent applications, and publications, and electronically available material cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims. The invention illustratively disclosed herein suitably may be practiced, in some embodiments, in the absence of any element which is not specifically disclosed herein.

What is claimed is:

1. A liquid epoxy resin composition suitable for use in forming a polyether polymer that can be used to coat a food or beverage container; wherein the liquid epoxy resin composition is a liquid at 20° C. and atmospheric pressure and is substantially free of bisphenol A, bisphenol F, bisphenol S, epoxides of bisphenol A, epoxides of bisphenol F, and epoxides of bisphenol S;
    wherein the liquid epoxy resin composition is prepared from reactants comprising one or more epihalohydrins and one or more ortho-substituted diphenol compounds comprising an organic ortho-substituted group;
    wherein the liquid epoxy resin composition comprises diepoxide resins comprising a base structure unit derived from the one or more ortho-substituted diphenol compounds and an "n" number of additional structural units derived from the one or more ortho-substituted diphenol compounds;
    wherein the liquid epoxy resin composition comprises more than 60 and less than about 75 weight percent of n=0 diepoxide resins derived from the one or more ortho-substituted diphenol compounds and at least 15 and less than about 25 weight percent of n=1 diepoxide resins derived from the one or more ortho-substituted diphenol compounds, based on the total weight of any unreacted ortho-substituted diphenol compounds that may be present and any compounds including at least one structural unit derived from the one or more ortho-substituted diphenol compounds; and
    wherein the liquid epoxy resin composition has a hydrolysable chloride content of less than or equal to 0.05 weight percent.

2. The composition of claim 1, wherein the liquid epoxy resin composition comprises more than 60 and less than about 70 weight percent of n=0 diepoxide resins derived from the one or more ortho-substituted diphenol compounds, based on the total weight of any unreacted ortho-substituted diphenol compounds that may be present and any compounds including at least one structural unit derived from the one or more ortho-substituted diphenol compounds.

3. The composition of claim 1, wherein the composition comprises at least 15 and less than about 20 weight percent of n=1 diepoxide resin derived from the one or more ortho-substituted diphenol compounds, based on the total weight of any unreacted ortho-substituted diphenol compounds that may be present and any compounds including at least one structural unit derived from the one or more ortho-substituted diphenol compounds.

4. The composition of claim 1, wherein the one or more epihalohydrins comprises epichlorohydrin.

5. The composition of claim 1, wherein each aromatic ring of the one or more ortho-substituted diphenol compounds is substituted with a methyl group at an ortho position.

6. The composition of claim 1, wherein each aromatic ring of the one or more ortho-substituted diphenol compounds is substituted with a methyl group at two ortho positions.

7. The composition of claim 1, wherein the one or more ortho-substituted diphenol compounds comprises an ortho-substituted bisphenol.

8. The composition of claim 7, wherein two aromatic rings of the ortho-substituted bisphenol are attached to one another by a —CH2— linkage.

9. The composition of claim 1, wherein the one or more ortho-substituted diphenol compounds comprises tetramethyl bisphenol F.

10. The composition of claim 1, wherein the n=0 and n=1 diepoxide resins derived from the one or more ortho-substituted diphenol compounds constitute at least 85 weight percent of the total weight of any unreacted ortho-substituted diphenol compounds that may be present and any compounds including at least one structural unit derived from one or more ortho-substituted diphenol compounds.

11. The composition of claim 1, wherein: the one or more epihalohydrins comprises epichlorohydrin; the one or more ortho-substituted diphenol compounds comprises tetramethyl bisphenol F (TMBPF); the composition optionally further comprises TMBPF-containing monoepoxide resins; and the n=0 and n=1 tetramethyl bisphenol F containing diepoxide resins constitute at least 85 weight percent and the TMBPF-containing monoepoxide resins constitute less than 5 weight percent, of the total weight of any unreacted TMBPF that may be present and any compounds including at least one structural unit derived from TMBPF.

12. The composition of claim 11, wherein the composition comprises more than 60 and less than about 75 weight percent of n=0 diepoxide compounds derived from tetramethyl bisphenol F, based on the total weight of any unreacted ortho-substituted diphenol compounds that may be present and any compounds including at least one structural unit derived from the one or more ortho-substituted diphenol compounds.

13. The composition of claim 11, wherein the n=0 and n=1 TMBPF-containing diepoxide resins constitute at least 85 weight percent of the total weight of any unreacted ortho-substituted diphenol compound that may be present and any compounds including at least one structural unit derived from the one or more ortho-substituted diphenol compounds.

14. The composition of claim 1, wherein the liquid epoxy resin composition has a hydrolysable chloride content of less than or equal to 0.02 weight percent.

15. The composition of claim 1, wherein the liquid epoxy resin composition optionally further contains water, in an amount of less than 1 weight percent.

16. The composition of claim 1, wherein the liquid epoxy resin composition optionally further contains unreacted epichlorohydrin, in an amount of less than 50 ppm.

17. The composition of claim 1, wherein the liquid epoxy resin composition optionally further contains unreacted ortho-substituted diphenol compounds, in an amount of less than 1,000 ppm.

18. The composition of claim 1, wherein the liquid epoxy resin composition optionally further contains mono-epoxide resins of the one or more ortho-substituted diphenol compounds, in an amount of less than 5 weight percent.

19. The composition of claim 1, wherein the liquid epoxy resin composition optionally further contains n≥2 diepoxide resins derived from the one or more ortho-substituted diphenol compounds, in an amount of less than 10 weight percent based on the total weight of any unreacted ortho-substituted diphenol compounds that may be present and any compounds including at least one structural unit derived from the one or more ortho-substituted diphenol compounds.

20. The composition of claim 1, wherein the liquid epoxy resin composition is storage stable for at least 1 month at about 20° C. at atmospheric pressure.

21. The composition of claim 1, wherein the liquid epoxy resin composition is storage stable for at least 6 months at about 20° C. at atmospheric pressure.

22. The composition of claim 1, wherein the liquid epoxy resin composition has a viscosity at 52° C. of 2,000 to 4,000 cps.

23. The composition of claim 1, wherein the liquid epoxy resin composition optionally further contains:
   water, in an amount of less than 0.05 weight percent;
   unreacted epichlorohydrin, in an amount of less than 10 ppm;
   unreacted ortho-substituted diphenol compounds, in an amount of less than 1,000 ppm;
   mono-epoxide resins of the one or more ortho-substituted diphenol compounds, in an amount of less than 3 weight percent; and n≥2 diepoxide resins derived from the one or more ortho-substituted diphenol compounds, in an amount of less than 5 weight percent based on the total weight of any unreacted ortho-substituted diphenol compounds that may be present and any compounds including at least one structural unit derived from the one or more ortho-substituted diphenol compounds;
wherein unless specified, the indicated concentration is based on the total weight of the liquid epoxy resin composition.

24. The composition of claim 1, wherein the final weight per epoxy equivalent of the liquid epoxy resin composition is within from about 10% to about 20% of the theoretical weight per epoxide equivalent for the n=0 diepoxide resin derived from the one or more ortho-substituted diphenol compounds.

25. The composition of claim 1, wherein TMBPF is the sole ortho-substituted diphenol compound reacted with the one or more epihalohydrins; and the weight per epoxide equivalent of the liquid epoxy resin composition is from about 200 to about 220 grams/epoxy equivalent.

26. The composition of claim 1, wherein the liquid epoxy resin composition comprises at least 90% by weight of diepoxide resin derived from the one or more ortho-substituted diphenol compounds, based on the total weight of the liquid epoxy resin composition.

27. The composition of claim 1, wherein the liquid epoxy resin composition when tested under ambient conditions using the Pour Test described herein, begins flowing out of the beaker within 180 minutes or less.

28. The composition of claim 1, wherein the liquid epoxy resin composition when tested under ambient conditions using the Pour Test described herein, begins flowing out of the beaker within 15 minutes or less.

29. A method for forming the liquid epoxy resin composition of claim 1 comprising reacting epichlorohydrin with the one or more ortho-substituted diphenol compounds in a molar ratio of from about 7:1 to about 1:1.

30. A method for forming the liquid epoxy resin composition of claim 1 comprising reacting epichlorohydrin with the one or more ortho-substituted diphenol compounds in a molar ratio of from about 5:1 to about 3:1.

31. An aromatic polyether polymer derived from the liquid epoxy resin composition of claim 1, wherein the polyether polymer is substantially free of bisphenol A, bisphenol F, and bisphenol S, epoxides of bisphenol A, epoxides of bisphenol F, and epoxides of bisphenol S thereof.

32. The aromatic polyether polymer of claim 31, wherein the polyether polymer is a reaction product of ingredients including the liquid epoxy resin composition of claim 1 and a diphenol, wherein the polyether polymer has a number average molecular weight of at least 2,000 and a Tg of at least 60° C.

33. The aromatic polyether polymer of claim 31, wherein the polyether polymer is a reaction product of ingredients including the liquid epoxy resin composition of claim 1 and a diphenol, wherein the polyether polymer has a number average molecular weight of at least 4,000 and a Tg of at least 70° C.

34. The aromatic polyether polymer of claim 31, wherein at least 50 weight percent of the polyether polymer constitutes structural units derived from the liquid epoxy resin composition.

\* \* \* \* \*